US012800108B2

(12) United States Patent
Owen et al.

(10) Patent No.: US 12,800,108 B2
(45) Date of Patent: Nov. 17, 2026

(54) HYDROGEN COMPRESSION, STORAGE, AND DISPENSING

(71) Applicant: HYDROGEN ACTIVE STORAGE SOLUTIONS, INC., Coto de Caza, CA (US)

(72) Inventors: Kelley Owen, Coto de Caza, CA (US); Raghu Kilambi, Miami, FL (US); Edward Green, Sewicky, PA (US); Lincoln Evans-Beauchamp, Austin, TX (US)

(73) Assignee: KNOBBE, MARTENS, OLSON & BEAR, LLP, CA (US)

( * ) Notice: Subject to any disclaimer, the term of this patent is extended or adjusted under 35 U.S.C. 154(b) by 654 days.

(21) Appl. No.: 18/065,559

(22) Filed: Dec. 13, 2022

(65) Prior Publication Data

US 2023/0184384 A1 Jun. 15, 2023

Related U.S. Application Data

(60) Provisional application No. 63/288,770, filed on Dec. 13, 2021.

(51) Int. Cl.
*F17C 5/04* (2006.01)

(52) U.S. Cl.
CPC .......... *F17C 5/04* (2013.01); *F17C 2225/035* (2013.01); *F17C 2250/0626* (2013.01); *F17C 2265/015* (2013.01)

(58) Field of Classification Search
CPC .................. F17C 2227/0192; F17C 2221/012
See application file for complete search history.

(56) References Cited

U.S. PATENT DOCUMENTS 5,454,408 A * 10/1995 DiBella ................. F04B 9/1176 141/47
8,424,574 B2 * 4/2013 Whiteman .............. F17C 5/007 141/47
9,162,410 B2 * 10/2015 Adler ........................ F04F 1/10
11,815,036 B2 * 11/2023 Khosravi ........... F02M 25/0222
2010/0139777 A1 6/2010 Whiteman
2010/0154924 A1 6/2010 Casey
2012/0130549 A1 * 5/2012 Fjalestad ................... F17C 5/06 700/282
2018/0119882 A1 5/2018 Allidieres et al.

FOREIGN PATENT DOCUMENTS

CN 104956141 A 9/2015
WO WO 2006/121343 A1 11/2006

OTHER PUBLICATIONS

Prakash et al., "Low Cost Hydrogen Storage at 875 bar Using Steel Liner and Steel Wire Wrap", Jun. 10, 2015 (Year: 2015).*
International Search Report and Written Opinion of the International Searching Authority for International Application No. PCT/US2022/052738, dated Apr. 24, 2023, in 9 pages.

* cited by examiner

*Primary Examiner* — Timothy P. Kelly

(57) ABSTRACT

A high-pressure gas compression, storage, and dispensing system. The system can include a storage vessel, a liquid sump tank, and a separation system. The pressure in the storage vessel can be controlled by partially filling or draining the storage vessel with the liquid. The stored gas can become partially saturated with the liquid, and the separation system can reduce the saturation.

32 Claims, 16 Drawing Sheets

200

200

200

200

200

200

200

200

200

200

400

HYDROGEN COMPRESSION, STORAGE, AND DISPENSING

INCORPORATION BY REFERENCE TO ANY PRIORITY APPLICATIONS

This application claims priority to U.S. Provisional Patent Application 63/288,770, filed Dec. 13, 2021, and entitled "ACTIVE HYDROGEN STORAGE SYSTEM." The foregoing application, and any other applications for which a foreign or domestic priority claim is identified in the Application Data Sheet as filed with the present application, are hereby incorporated by reference under 37 CFR 1.57.

BACKGROUND

Field

This application relates generally to systems and methods for compressing, storing, accumulating, and/or dispensing hydrogen gas. Some embodiments of the system can be used to implement a vehicle fueling station that reduces operation size and capital, as compared to existing fueling stations.

Description of the Related Art

Hydrogen is an efficient fuel source that is comparatively less harmful to the environment than other fuel sources which are burned. Through combustion or fuel cell reactions, hydrogen can be combined with oxygen to produce heat or electric power. The primary waste product from these reactions is water.

Within the transportation, power generation, and steel industries, hydrogen is the main focus to transition from fossil fuels to green energy fuels. Unfortunately, with this transition many of the industries are faced with the large volume required to store the hydrogen gas.

Standard hydrogen storage vessels typically have a metal or composite structure and are designed with a fixed volume. The hydrogen gas is compressed to high pressures to store as much mass in the tank as possible to minimize the volume and weight of the storage vessel. Vehicle storage tanks are typically filled with hydrogen gas from the high-pressure source, where tank pressures range from 350 bar to 700 bar. As hydrogen is drawn from a hydrogen storage tank for use, the pressure in the tank is reduced. Below certain pressures, the hydrogen in the storage tank is typically no longer usable because it lacks the required pressure to flow from the storage tank to the vehicle. Hence, the only hydrogen that is usable is that which is stored above the pressure required to fuel the vehicle storage tank. Typical hydrogen storage vessels are charged to a pressure 25% higher than required for the system that uses the hydrogen (e.g., the refueling vehicle), so only about 20% of the storage system's volume and mass are usable before the reduced hydrogen pressure makes the hydrogen unusable.

To make more hydrogen usable, hydrogen storage tanks need to either be charged to higher pressures or become larger, increasing costs and/or space requirements. Storage tank pressure is only increased when additional hydrogen is charged into it. Charging is usually accomplished with a mechanical compressor that compresses lower pressure hydrogen to the storage tank pressure. However, gaseous hydrogen mechanical compressors require a great deal of maintenance, and materially affect the uptime of hydrogen fueling stations as well as the maintenance costs.

SUMMARY

In some embodiments, a high-pressure gas storage system comprises: a storage vessel; a liquid sump tank; and a separation system, wherein the pressure in the storage vessel is controlled by partially filling or draining the storage vessel with the liquid, wherein the stored gas becomes partially saturated with the liquid, and wherein the separation system reduces the saturation.

In some embodiments, a high-pressure gas compression system comprises: a storage vessel; a compression vessel; a liquid sump tank; and a separation system, wherein a gas is compressed in the compression vessel by partially filling the compression vessel with the liquid, wherein the compressed gas is transferred from the compression vessel to the storage vessel, gas pressure in the storage vessel being controlled by partially filling or draining the storage vessel with the liquid, wherein the compressed gas becomes partially saturated with the liquid, and wherein the separation system reduces the saturation.

DETAILED DESCRIPTION

Systems and methods for compressing, storing, and/or dispensing high-pressure gases, such as hydrogen, are disclosed herein. Embodiments of the systems and methods can be used to implement a vehicle fueling station which allows for a greater portion of the storage system's volume to be usable, as compared to existing systems. As described further herein, some embodiments include a water system, a compression vessel, a storage vessel, and a dispensing system. The water system can force water into, or release water from, the compression and/or storage vessels, thereby changing the available volume for the high-pressure gas and managing the pressure of the gas. Compared to conventional hydrogen compression, storage, and/or dispensing systems, embodiments of the systems described herein can result in systems that are about a fifth, or less, of the size and cost. In addition, according to the embodiments described herein, the hydrogen can be pressurized by a water pump, instead of a gas compressor, thus greatly increasing the reliability and decreasing the maintenance costs of the resulting system.

Figure 1A:
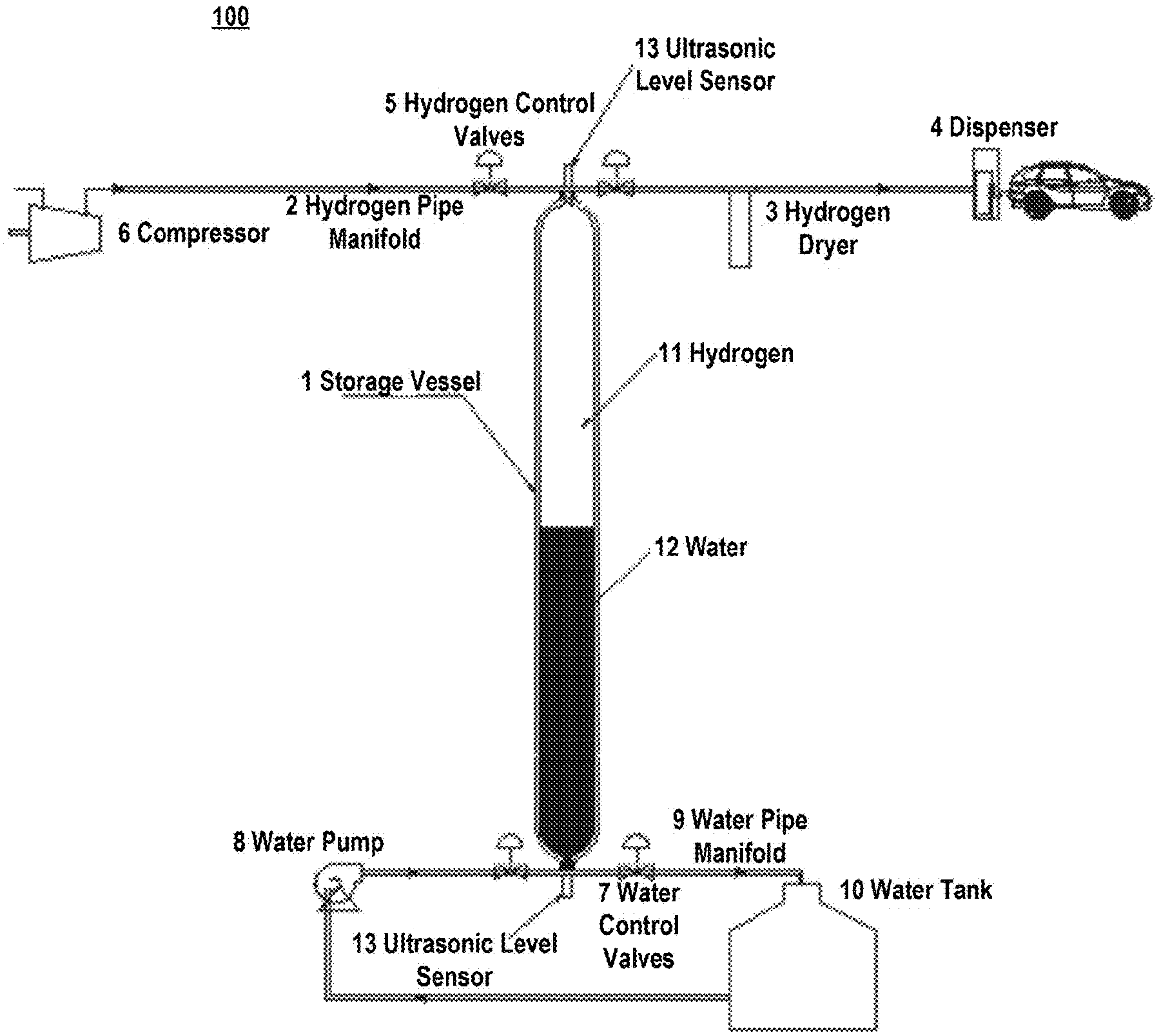
FIG. 1A is a schematic diagram of an example embodiment of a hydrogen compression, storage, and dispensing system.

FIG. 1A is a schematic diagram of an example embodiment of a hydrogen compression, storage, and dispensing system 100. The hydrogen storage system 100 requires less space than a conventional system. An objective of the system 100 in FIG. 1A is to provide users with a hydrogen storage system that utilizes a high-pressure liquid to control the volume of the compressed hydrogen. The system 100 shown in FIG. 1A can have lower maintenance costs, lower operational costs, and can require less space than conventional hydrogen compression, storage, and dispensing systems. To accomplish this the system 100 includes a water system (e.g., a water pump 8, water control valve(s) 7, and a water tank 10), a storage vessel 1, and a dispensing system (e.g., a hydrogen dryer 3 and a dispenser 4). Many of these components allow for the system 100 to keep the hydrogen stored at a variety of required pressures.

In some embodiments, the dispensing system connects to the storage vessel 1 at a top level sensor 13. At the bottom of the storage vessel 1 is a bottom level sensor 13 where the water system is connected. The storage vessel 1 can be designed to properly store both hydrogen and a high-pressure liquid, such as water, to allow for the continuous volume control of the hydrogen gas. The system 100 can be used to implement a hydrogen vehicle fueling station where the required high storage pressure is maintained with a small storage vessel footprint by actively controlling the compressed hydrogen volume with a high-pressure liquid.

Figure 1B:
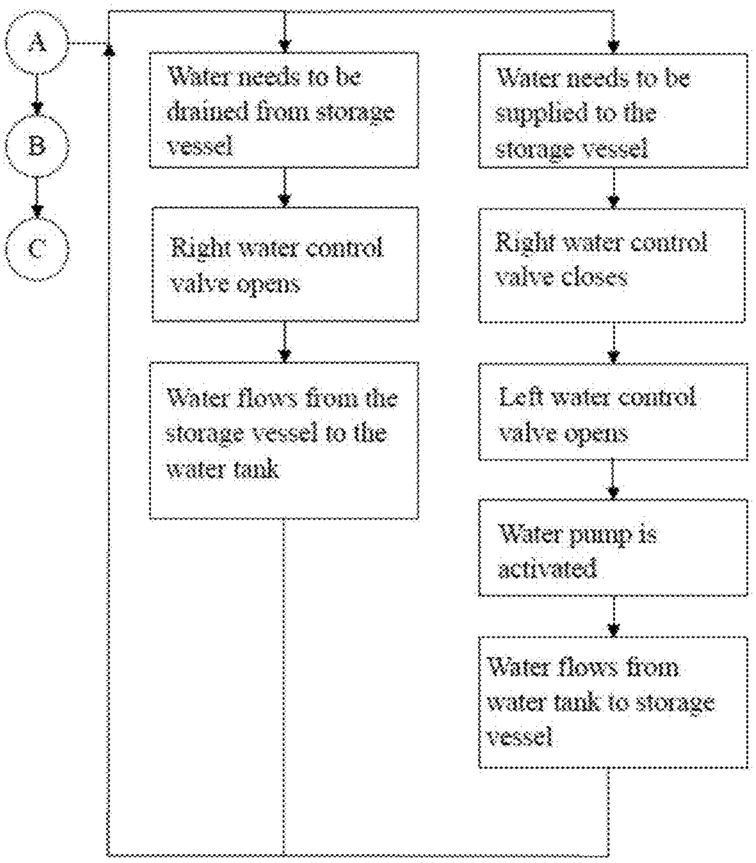
FIG. 1B is an example flow chart of operation of the water system for the system illustrated in FIG. 1A.

The system 100 utilizes a high-pressure liquid, such as water, with the water system. The water system pumps water into the storage vessel 1 to control the volume of hydrogen within. The water system can include a water tank 10, a plurality of water control valves 9, and a water pump 8. The water tank 10 is located at the bottom of the loop with a water control valve 7 on either opening. The water tank 10 stores water within until it needs to be transferred to the storage vessel 1. The water tank 10 can be designed with two openings to allow for water to enter and leave the water tank 10, as seen in FIG. 1A. Connected to the exit port of the water tank 10 is the water pump 8. The water pump 8 pulls water from the water tank 10 and passes through one open water control valve 7 to the storage vessel 1. As shown in FIG. 1B, once a target pressure is reached and more hydrogen is needed within the storage tank 1 one of the water control valves 7 opens to allow water to enter the water tank 10. As the pressure drops from hydrogen leaving the storage vessel 1, the water pump 8 can be activated to pull water from the water tank 10 through the open water control valve 7 and into the storage vessel 1 as the hydrogen is dispensed. It should be further noted that, the water system can be created in many various shapes and sizes and with the system operating in various ways without departing from the scope of the system 100.

The storage vessel 1 connects with the water system at the top of the water system between the plurality of water control valves 7. The storage vessel 1 can be designed with a metal or composite material that can maintain its form under high levels of pressure. In some embodiments, the storage vessel 1 is composed of SA372 Gr J CL 70XXX material. In some embodiments, the storage vessel 1 stores hydrogen 11 and water 12. The storage vessel 1 can include a plurality of level sensors 13. The hydrogen 11 and high-pressure water 12 can be stored within the storage vessel 1 with the ratio being altered as needed to change the pressure of the hydrogen within the vessel. Although water 12 is illustrated as the high-pressure liquid in the storage vessel 1, other liquids can also be used.

Figure 1C:
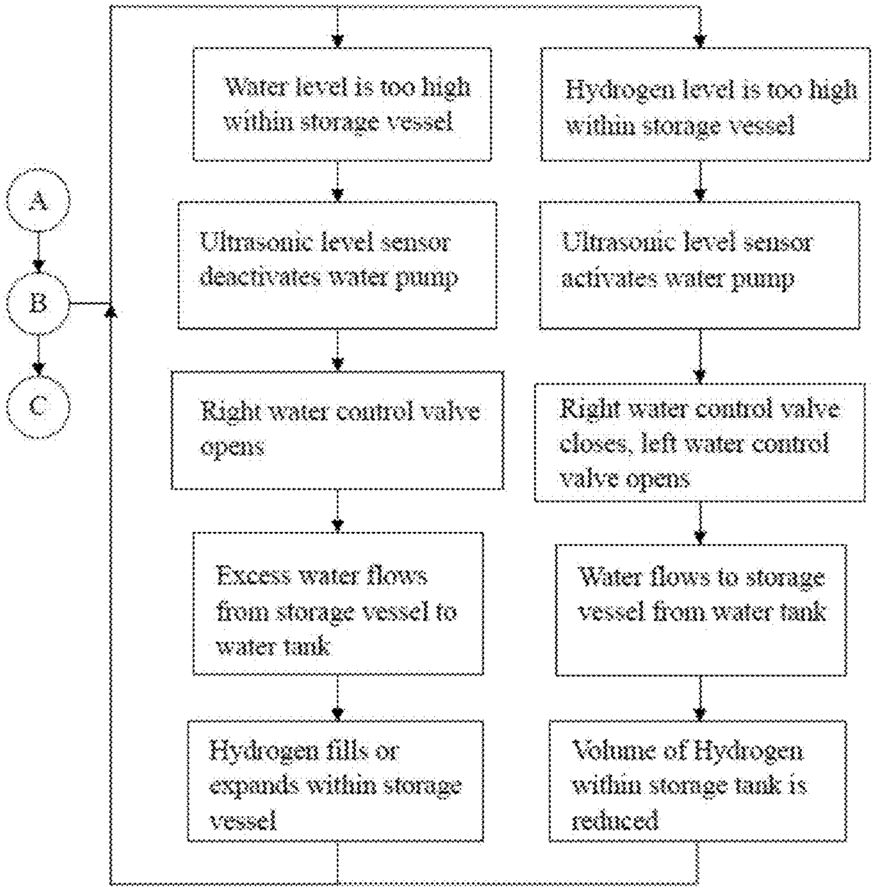
FIG. 1C is an example flow chart of operation of the storage vessel for the system illustrated in FIG. 1A.

Positioned at the top and bottom of the storage vessel 1 are the plurality of level sensors 13 where the storage vessel connects to the water system and dispensing system. The plurality of level sensors 13 can be ultrasonic sensors that can detect the hydrogen 11 and water 12 levels through the storage vessel 1 walls to determine the location of the hydrogen to water interface. This design allows the water 12 to be pumped into, and out of, the storage vessel 1 while ensuring that the hydrogen 11 does not enter into the water system and that water does not enter into the dispensing system. As seen in FIG. 1C, if the water 12 is too high within the storage vessel 1 the water pump 8 shuts off and water is drained from the storage vessel 1. Similarly, if the hydrogen level is too high the water pump 8 is turned on and water is pumped into the storage vessel 1. Once the hydrogen 11 within the storage tank 1 is ready for use it enters the dispensing system.

Figure 1D:
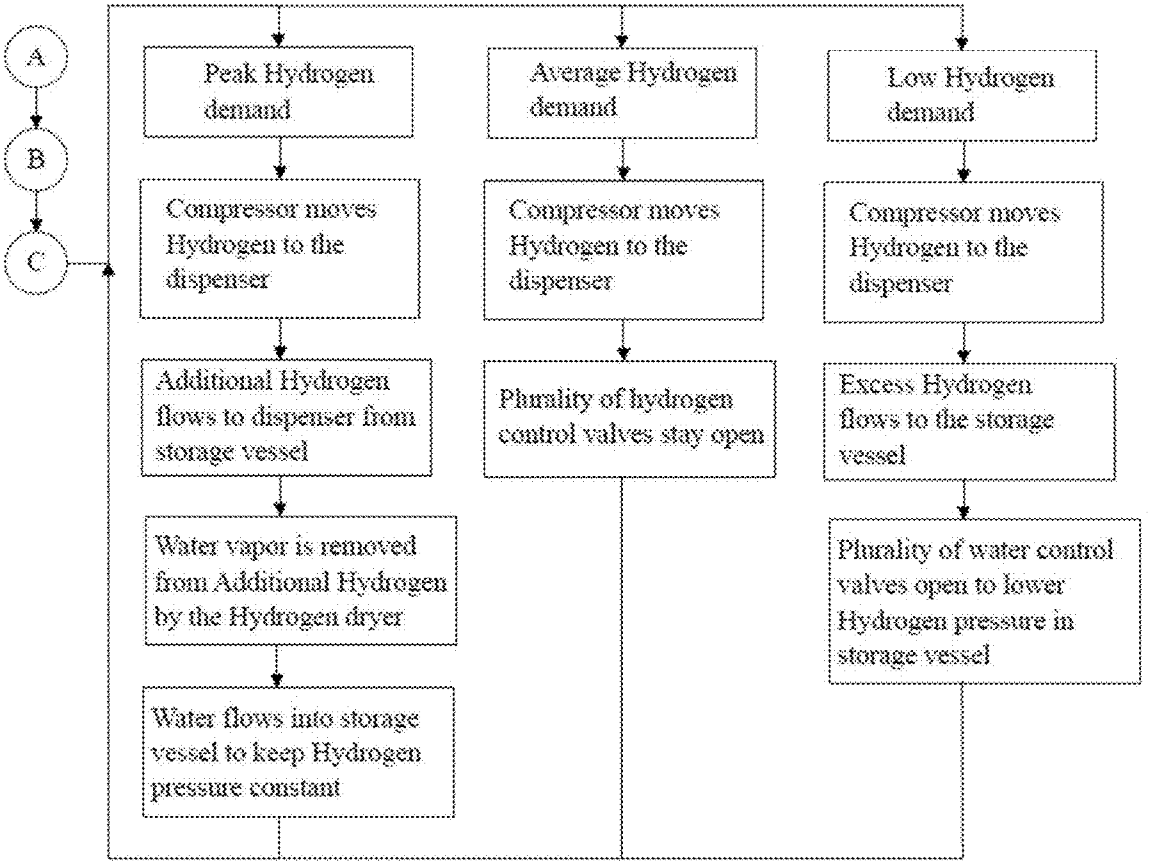
FIG. 1D is an example flow chart of operation of the dispensing system for the system illustrated in FIG. 1A.

The dispensing system connects to the storage vessel 1 along the top side of the storage vessel. In some embodiments, the dispensing system can include a compressor 6, a plurality of hydrogen control valves 5, a hydrogen dryer 3, and a dispenser 4. The plurality of hydrogen control valves 5 are attached on either side of the storage vessel 1 to control the flow and direction of flow for the hydrogen gas 11. Positioned terminally to the left of the plurality of hydrogen control valves 5 is the compressor 6. Opposite the compressor 6 is the hydrogen dryer 3 that is designed to remove any water vapor that has accumulated within the hydrogen gas 11. Further, off to the right of the hydrogen dryer 3 is the dispenser 4 that transfers the hydrogen gas to the vehicle tank. As shown in FIG. 1D, the dispensing system can be equipped with a compressor 6 to supply the average flow rate of hydrogen 11 required based on external environmental factors such as time of day. During the peak demand period the compressor 6 continues to directly move hydrogen 11 towards the dispenser 4. To accommodate the difference between the average hydrogen demand for which the compressor 6 is sized and the peak demand needed, hydrogen from the storage vessel can be released from the storage vessel 1 to the hydrogen dryer 3 where any excess water vapor is removed and then the hydrogen flows to the dispenser 4. With all the components working in tandem with each other it can be seen that, the system 100 can implement a hydrogen vehicle refueling station where the required high storage pressure is maintained with a small storage vessel footprint by actively controlling the compressed hydrogen volume with a high-pressure liquid.

Although FIG. 1A illustrates a system 100 which includes a mechanical gas compressor 6, other embodiments described herein can use the water and a high-pressure water pump for compressing hydrogen gas without requiring a mechanical gas compressor. Such an embodiment is illustrated in FIG. 2A.

Figure 2A:
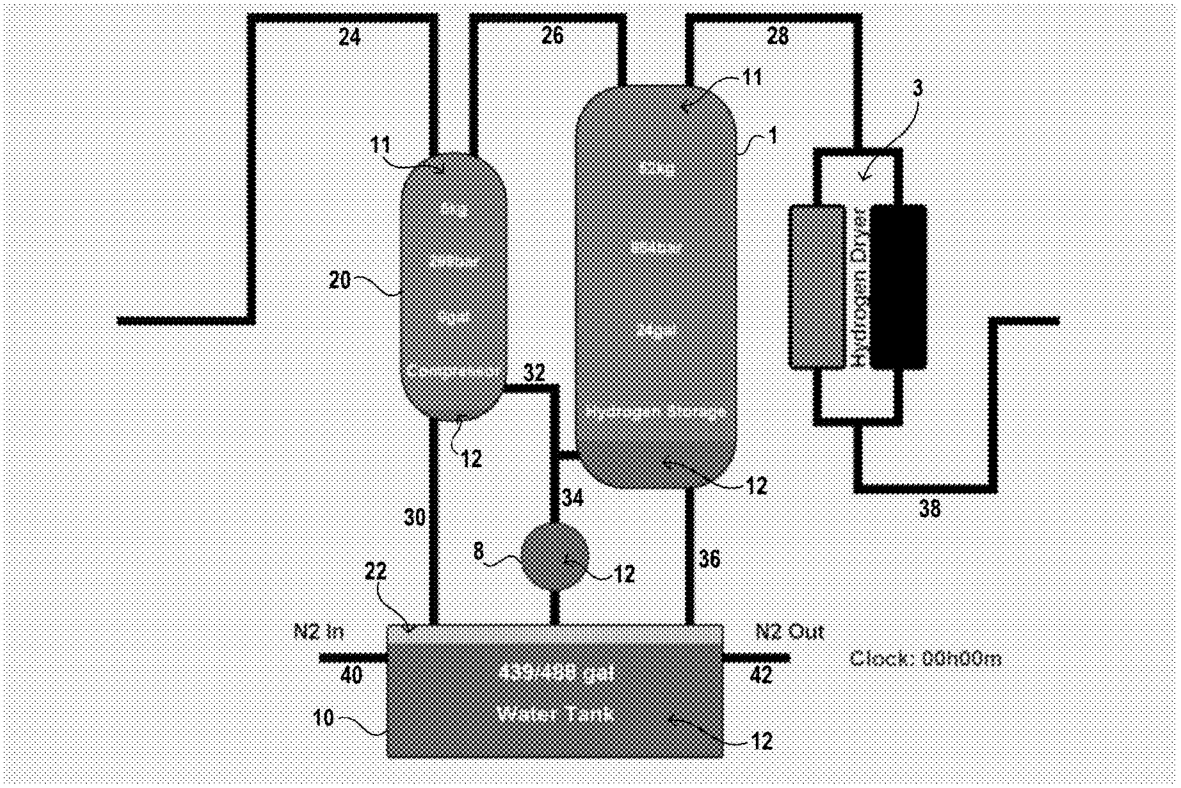
FIG. 2A is a schematic diagram of another example embodiment of a hydrogen compression, storage, and dispensing system.

FIG. 2A is a schematic diagram of another example embodiment of a hydrogen compression, storage, and dispensing system 200. As shown in FIG. 2A, the illustrated embodiment includes one or more gas compression vessels 20, one or more gas storage vessels 1, one or more separation systems (e.g., a hydrogen dryer 3), and one or more liquid systems (e.g., a water pump 8 and a water tank 10). The compression vessel 20 and storage vessel 1 can be partially filled with liquids (e.g., water) from the liquid system(s) and with gas (e.g., hydrogen gas). Gas can be drawn into the compression vessel 20 by allowing the liquid in the compression vessel to return to the liquid system. The gas can be compressed and pumped into the storage vessel 1, or directly to the separator system 3, by filling the compression vessel 20 with liquid from the liquid system. Likewise, the pressure in the storage vessel 1 can be controlled by varying the amount of liquid partially filling the storage vessel. For example, as the amount of storage gas is reduced as it is used, the liquid system can add additional liquid to the storage vessel 1, thus reducing the available volume for the stored gas and raising its pressure. In cases where the gas pressure must be maintained above a certain pressure to be useful for the end use, the compression vessel 20 and storage vessel 1 allow for substantially all of their storage gases (e.g., greater than 75%, or greater than 90%, or greater than 95%, or greater than 99%) to be available for use. The gas may become saturated (e.g., above 75%) with the liquid's vapor state. This complication can be mitigated in some embodiments by providing for a separation device that is located at the boundary between the liquid and gas, physically limiting their contact. Additionally, the separation system (e.g., the hydrogen dryer 3) can remove or reduce the saturation of the liquid in the stored gas. In some embodiments, the separation system may be a desiccant system. Such a desiccant system may be regenerated using pressure swing adsorption (PSA) technology. The separation system, when regenerating, can vent separated liquid/gas or recycle those materials back to the compression vessel 20.

The liquid system (e.g., the water pump 8 and the water tank 10) allows for the movement of liquids into and out of the compression vessel 20 and the storage vessel 1. When not in the compression vessel 20 and storage vessel 1, the liquid is typically stored in one or more sump vessels, such as the water tank 10. The sump vessel is typically designed to limit the contamination of the liquid from gases or other materials that would negatively impact the stored gas. As such, the sump vessel typically allows for a variable volume, may include a batch or periodic purification system, and/or may be covered with an inert gas blanket (e.g., nitrogen 22 with a concentration of 95% purity, or more). Further, the sump vessel may be maintained at an overpressure. The overpressure may be, for example, at least 1 bar gauge. The sump vessel may be held at a positive pressure to help prevent ambient gases from contaminating the liquid inside. The positive pressure also helps supply the required net positive suction head for the pump 8.

Because the pressurization of the gases in the compression vessel 20 and the storage vessel 1 is achieved with a high-pressure liquid pump, instead of gaseous pumps, that pressurization is typically achieved with much lower maintenance costs and efforts.

In some embodiments of the system, the gas is hydrogen which is pressurized above 350 bar, or above 700 bar, and the liquid is water, usually a higher-purity water (e.g., type II or type III) to limit contamination of the hydrogen gas. The hydrogen may become saturated with water vapor because of that contact, which may be limited with the use a separation device. The separation system in this instance can be a desiccant pressure-swing adsorber which reduces the water content in the hydrogen gas required for dispensing the hydrogen gas. The resulting hydrogen storage tanks are typically ⅕th the volume and cost, compare to systems that do not employ a variable-volume storage tank.

The hydrogen compression, storage, and dispensing system 200 shown in FIG. 2A will now be described in more detail. As already discussed, the system 200 includes a compression vessel 20, a storage vessel 1, a water pump 8, a water tank 10, and a hydrogen dryer 3. The compression vessel 20 can be connected via a gas supply line 24 to a source of hydrogen gas, such as a tanker truck or a methane steam reformer system. The compression vessel 20 can be connected to the storage vessel 1 via gas transfer line 26. The storage vessel 1 can be connected to the hydrogen dryer 3 via gas transfer line 28. Gas from the hydrogen dryer 3 can be output to a refueling vehicle via gas output line 38. The system 200 can also include water drain line 30 to drain water from the compression vessel 20 to the water tank 10 and water drain line 36 to drain water from the storage vessel 1 to the water tank 10. The water pump 8 can be connected to the compression vessel 20 by water supply line 32, and to the storage vessel 1 by water supply line 34. Lastly, the system 200 can include a nitrogen supply line 40 for adding nitrogen to the water tank 10, as well as a nitrogen output line 42 for removing nitrogen from the water tank.

Although not specifically illustrated, the system 200 can also include a variety of sensors (e.g., level sensors, flow sensors, pressure sensors, temperature sensors, etc.). Level sensors can be used, for example, to determine the level of water or hydrogen within the compression vessel 20 and/or the storage vessel 1. Pressure sensors can likewise be used to determine gas pressures inside the compression vessel 20 and/or the storage vessel 1. The sensors can provide their outputs to a controller which is communicatively coupled to them. The system 200 can also include a variety of valves for controlling the transfer of hydrogen, water, and/or nitrogen between the various components of the system. For example, one or more valves can be provided at the inlet(s) and/or outlet(s) of each of the illustrated components. One or more valves can also be provided along the various connecting lines. The valves can be controlled by the controller which is communicatively coupled to them. The controller can control the state of the system 200 based on inputs from the sensors and/or user inputs.

Figure 2B:
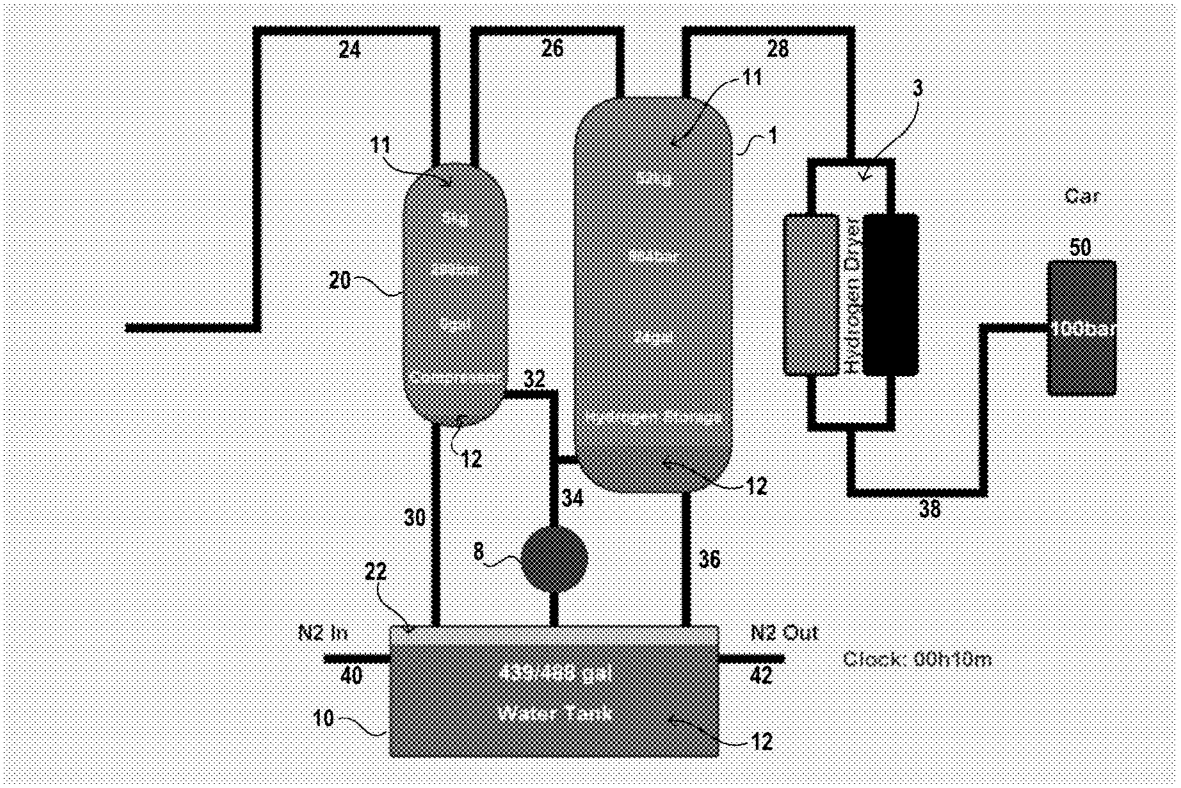
FIG. 2B illustrates a hydrogen vehicle which includes an onboard storage tank that is connected to the system of FIG. 2A via the hydrogen output line.

FIG. 2B illustrates a hydrogen vehicle which includes an onboard storage tank 50 that is connected to the system 200 via the hydrogen output line 38. A refueling vehicle connects to the dispenser with a recommended 100 bar of hydrogen remaining in its onboard hydrogen storage tank 50. A typical vehicle requires approximately 5 kg of hydrogen to refuel the onboard tank to 700 bar. This process may typically take 1-3 minutes to complete. In FIG. 2B, the storage vessel 1 is illustrated with a state in which it is ready to refuel the vehicle. In this example, the supply vessel 1 currently holds 52 kg of hydrogen gas 11 at a pressure of 864 bar. The supply vessel 1 also includes 24 gallons of water 12 at the bottom of the vessel. In some embodiments, the system 200 may maintain gas pressure in the storage vessel 1 at or above 750 bar absolute.

Figure 2C:
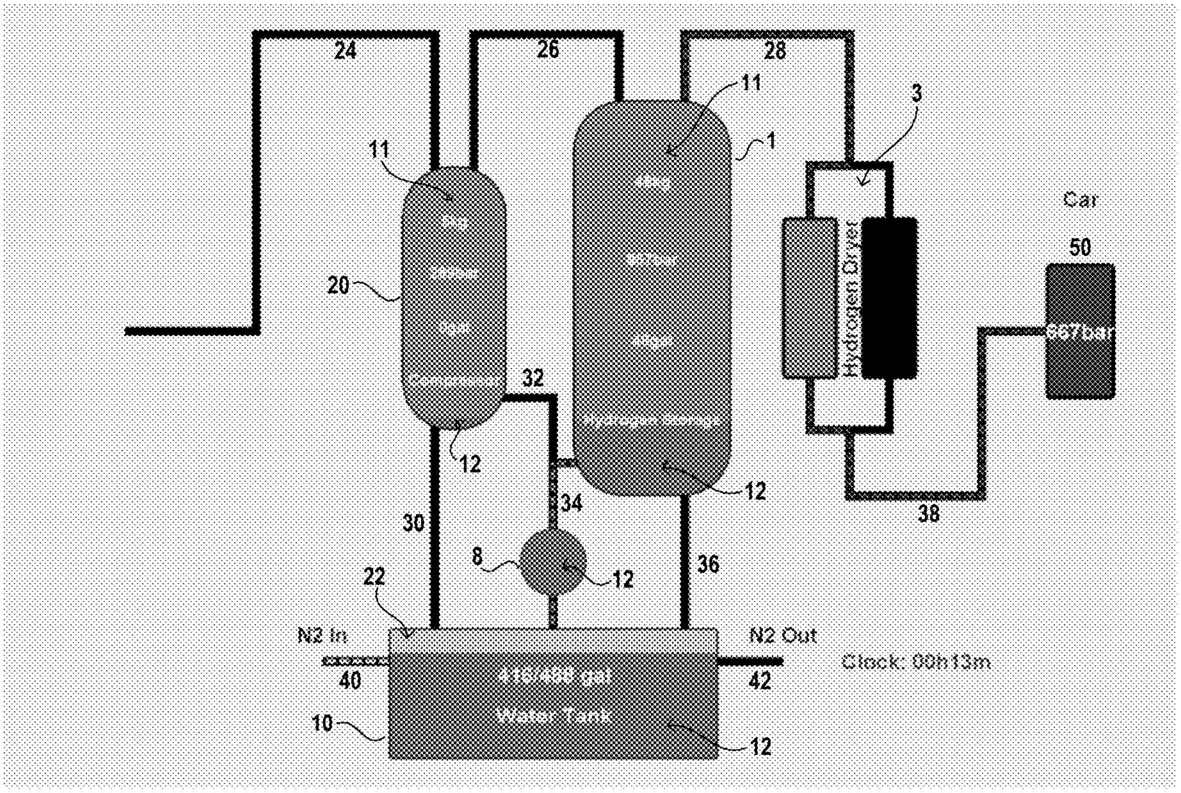
FIG. 2C illustrates the refueling process and the transfer of hydrogen gas from the storage vessel to the onboard storage tank of the refueling car.

FIG. 2C illustrates the refueling process and the transfer of hydrogen gas from the storage vessel 1 to the onboard storage tank 50 of the refueling car. To initiate the refueling operation, the controller can be operated to open a valve at, for example, the gas output of the supply vessel 1. Hydrogen gas can flow out of the supply vessel 1 to the onboard storage tank 50 of the refueling vehicle. Since the pressure of the hydrogen gas 11 within the storage vessel 1 is higher than that of the hydrogen gas within the refueling vehicle's onboard storage tank 50, hydrogen gas flows from the storage vessel 1 to the refueling vehicle. This is indicated by the dashed line along supply line 28 to the hydrogen dryer 3 and along output line 38 to the refueling vehicle. As hydrogen is removed from the storage vessel 1, the pressure drops slightly. This may trigger the controller to cause the high-pressure water pump 8 to transfer water 12 into the storage vessel 1 to backfill the storage vessel with water, thus raising the hydrogen pressure again. When the level of hydrogen in the storage tank 1 is determined to be low, it can be re-filled from a low-pressure source (e.g., a tanker truck), using the compression vessel 20, as described herein. The high-pressure water pump 8 can compress hydrogen in the compression vessel 20 by transferring water into the compression vessel. When the hydrogen in the compression vessel 20 reaches the working pressure, it can be released into the storage vessel 1. As hydrogen gas enters the storage vessel 1, water can be released from the storage vessel to maintain the working pressure. The dispenser can continue to operate during compression and filling of the storage vessel 1.

Figure 4:
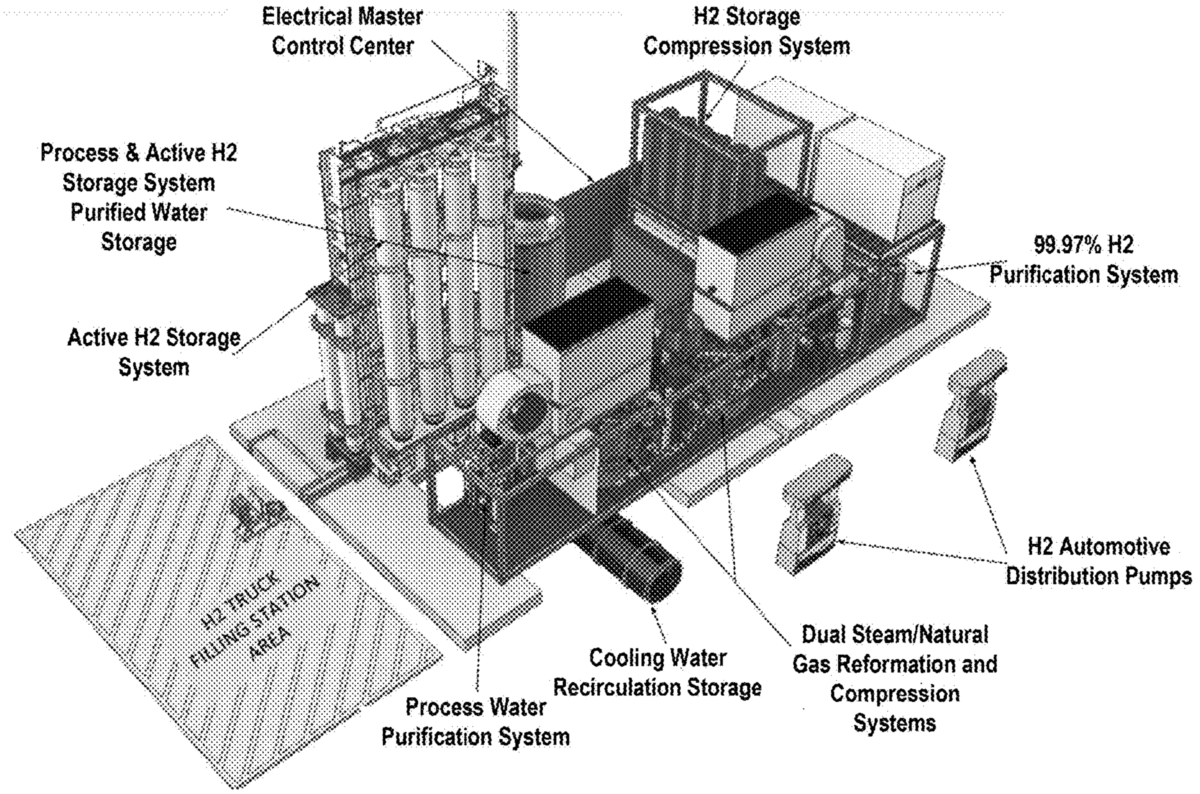
FIG. 4 illustrates an example hydrogen refueling station 400 which can include any of the hydrogen compression, storage, and/or dispensing systems described herein.

In the illustrated example of FIG. 2C, 4 kg of hydrogen gas have been transferred and the onboard storage tank 50 of the refueling vehicle has been charged to 667 bar. The loss of 4 kg of hydrogen gas from the storage vessel 1 has resulted in a reduction of the pressure of hydrogen gas within the storage vessel 1. However, this has been compensated for by transferring water 12 from the water tank 10 to the storage vessel 1 with the high-pressure water pump 8. The transfer of water 12 can be accomplished by, for example, opening a valve at the water inlet of the storage vessel 1 and then turning on the water pump 8 using the controller. This operation results in the transfer of water 12 from the water tank 10 to the storage vessel 1, as indicated by the dashed line along water supply line 34. In the example illustrated in FIG. 2C, the amount of water in the storage vessel 1 has been increased to 48 gallons. This increase in the volume of the storage vessel 1 occupied by water 12 has pressurized the remaining hydrogen gas 11 to 857 bar, thus compensating for the volume of gas transferred to the refueling vehicle. It should be understood, however, that any amount of water 12 can be transferred to the supply vessel 1 so as to achieve any desired pressure of the stored hydrogen gas 11 (within the operating parameters of the system 200).

As water is drawn from the water tank 10, a nitrogen blanket can be added to prevent oxygen from entering the water. When water is returned to the water tank, the nitrogen blanket can be removed in order to vent any hydrogen which may have been absorbed by the water. FIG. 2C illustrates that nitrogen gas is being added to the water tank 10 to maintain the nitrogen blanket at the top of the water tank and to compensate for the water 12 which has been transferred to the storage vessel 1. This can be accomplished by using the controller to operate a valve at the nitrogen inlet of the water tank 10 so as to allow nitrogen gas to be transferred into the tank via the nitrogen supply line 40.

Figure 2D:
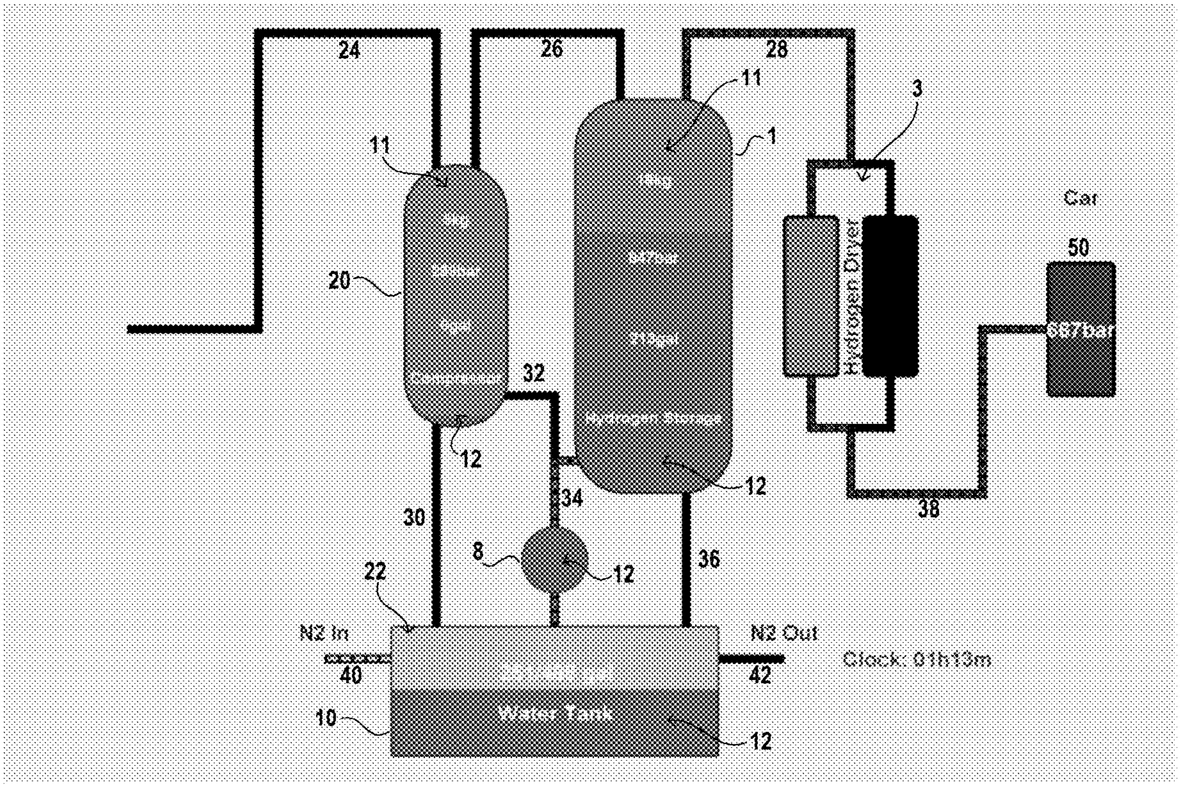
FIG. 2D illustrates the status of the system 200 while performing a subsequent refueling operation.

FIG. 2D illustrates the status of the system 200 while performing a subsequent refueling operation. In this example, the system 200 has refueled several vehicles. The amount of hydrogen gas 11 within the storage vessel 1 has now been reduced to 18 kg. Meanwhile, the volume of water 12 within the supply vessel 1 has been increased to 213 gallons. The increase in the volume of water 12 within the supply vessel 1 has maintained the pressure of the hydrogen gas 11 within the storage vessel 1 at 847 bar in spite of the fact that the amount of hydrogen gas within the storage vessel has been reduced from 52 kg to 18 kg. In a conventional hydrogen refueling system, the loss of hydrogen gas from the storage vessel 1 likely would have reduced the pressure of the gas within the storage vessel to a value which would no longer be capable of charging the onboard tank 50 of a refueling vehicle. In such a conventional system, the remaining hydrogen gas within the storage vessel 1 could not be used without first adding additional hydrogen gas to the vessel so as to raise the pressure. In the illustrated embodiment of the system 200, however, the added volume of water 12 within the storage vessel 1 has maintained the pressure of the hydrogen gas at a level which can still be used for refueling regardless of the amount of hydrogen gas remaining in the storage vessel 1.

Figure 2E:
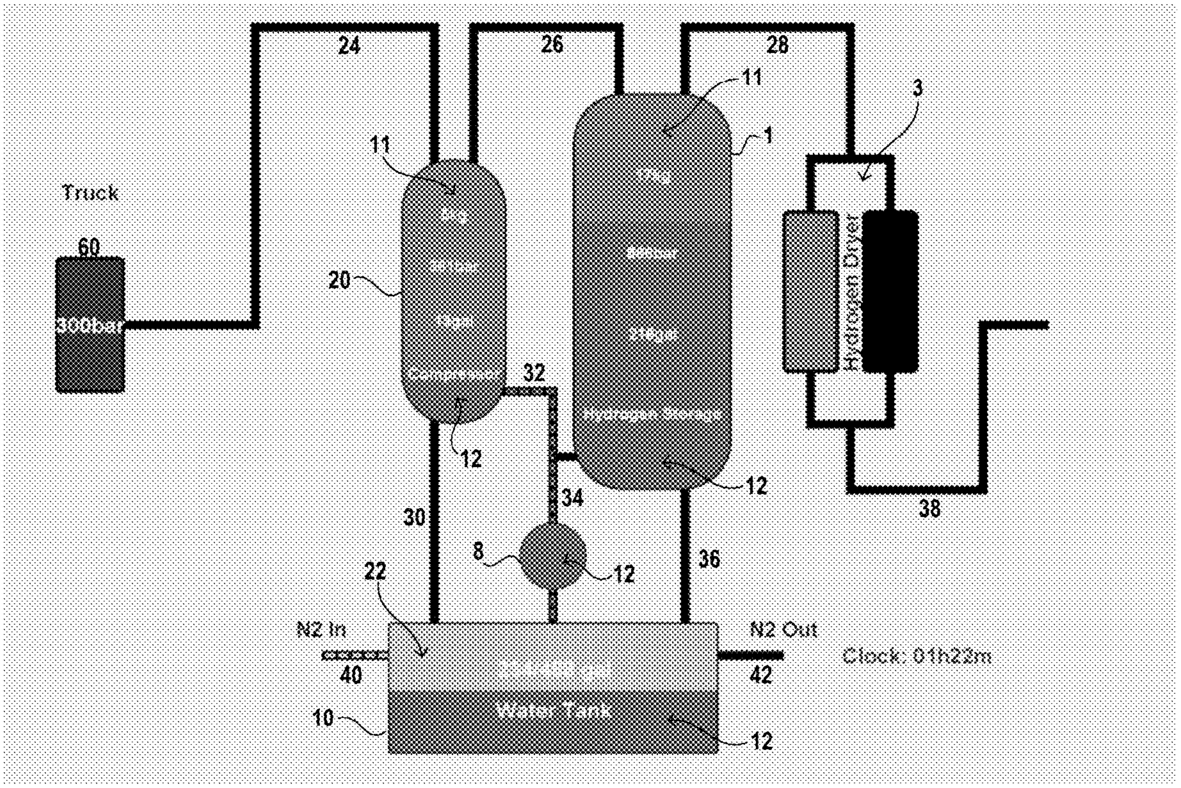
FIG. 2E operation of the compression vessel in the system of FIG. 2A.

FIG. 2E operation of the compression vessel 20 in the system 200 of FIG. 2A. As illustrated, the compression vessel 20 currently holds 5 kg of hydrogen gas 11 at a pressure of 361 bar. The compression vessel 20 also currently holds 13 gallons of water 12. The compression vessel 20 is used to refill the storage vessel 1 with hydrogen gas 11. However, as illustrated in FIG. 2E, the pressure of hydrogen gas in the compression vessel 20 (361 bar) is currently substantially lower than the pressure of the hydrogen gas in the storage vessel 1 (866 bar). Thus, hydrogen gas 11 will not flow from the compression vessel 22 the storage vessel 1. In order for hydrogen gas 11 to flow from the compression vessel 20 to the storage vessel 1, the pressure of the hydrogen gas within the compression vessel must first be increased. This is accomplished by using the water pump 8 to pump water 12 from the water tank 10 to the compression vessel 20. This can be accomplished by using the controller to open a water inlet valve at the compression vessel 20 and turning on the water pump 8. The dashed line along water supply line 32 indicates that water is flowing into the compression vessel 20. As the water occupies a larger portion of volume inside the compression vessel 20, it compresses the hydrogen gas 11. In some embodiments, hydrogen gas is inlet to the compression vessel 20 at or below 400 bar absolute, or at or below 300 bar absolute, or at or below 200 bar absolute or at or below 100 bar absolute. In some embodiments, compressed hydrogen is exhausted from the compression vessel 20 at above 50 bar absolute, or above 100 bar absolute, or above 200 bar absolute, or above 300 bar absolute, or above 400 bar absolute, or above 500 bar absolute, or above 600 bare absolute, or above 700 bar absolute, or above 800 bar absolute.

Figure 2F:
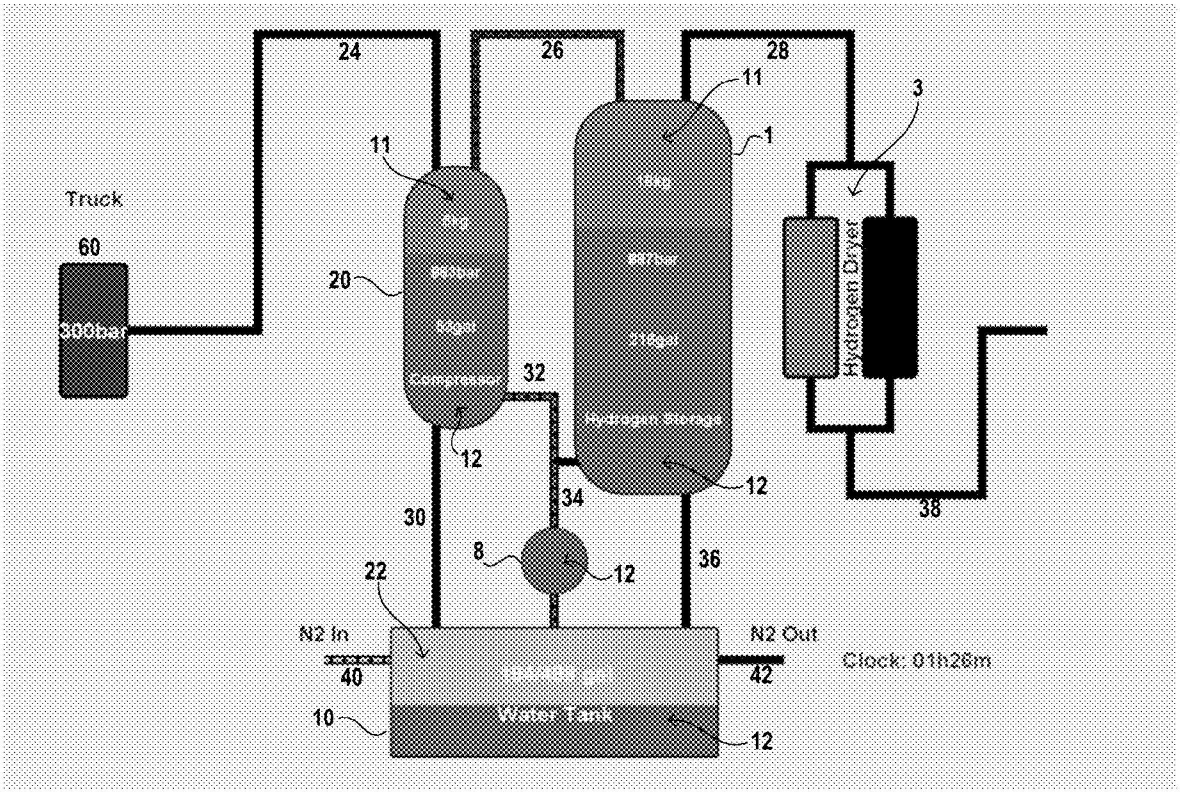
FIG. 2F illustrates the transfer of pressurized hydrogen gas from the compression vessel to the storage vessel.

FIG. 2F illustrates the transfer of pressurized hydrogen gas 11 from the compression vessel 20 to the storage vessel 1. As already discussed with respect to FIG. 2E, water 12 is pumped into the compression vessel 20 in order to pressurize the hydrogen gas 11 to a desired amount. As illustrated in FIG. 2F, sufficient water 12 has been pumped into the compression vessel 20 so as to pressurize the 5 kg of hydrogen gas inside to a pressure of 863 bar. Once the hydrogen gas 11 inside the compression vessel 20 is sufficiently pressurized, the controller can open a valve between the compression vessel and the storage vessel 1 so as to allow hydrogen to flow (as shown by dashed line) through transfer line 26. In some embodiments, a check valve can be provided between the compression vessel 20 and the storage vessel 1. The hydrogen gas pressure can build inside the compression vessel 20 by adding high pressure water. Once the hydrogen gas pressure in the compression vessel 20 exceeds the hydrogen gas pressure inside the storage vessel 1, the hydrogen gas can transfer to the storage vessel 1. Some of the water in the storage vessel 1 can be released to lower the hydrogen pressure in the storage vessel to assist the transfer of hydrogen gas from the compression vessel 20, as shown in FIG. 2G.

Figure 2G:
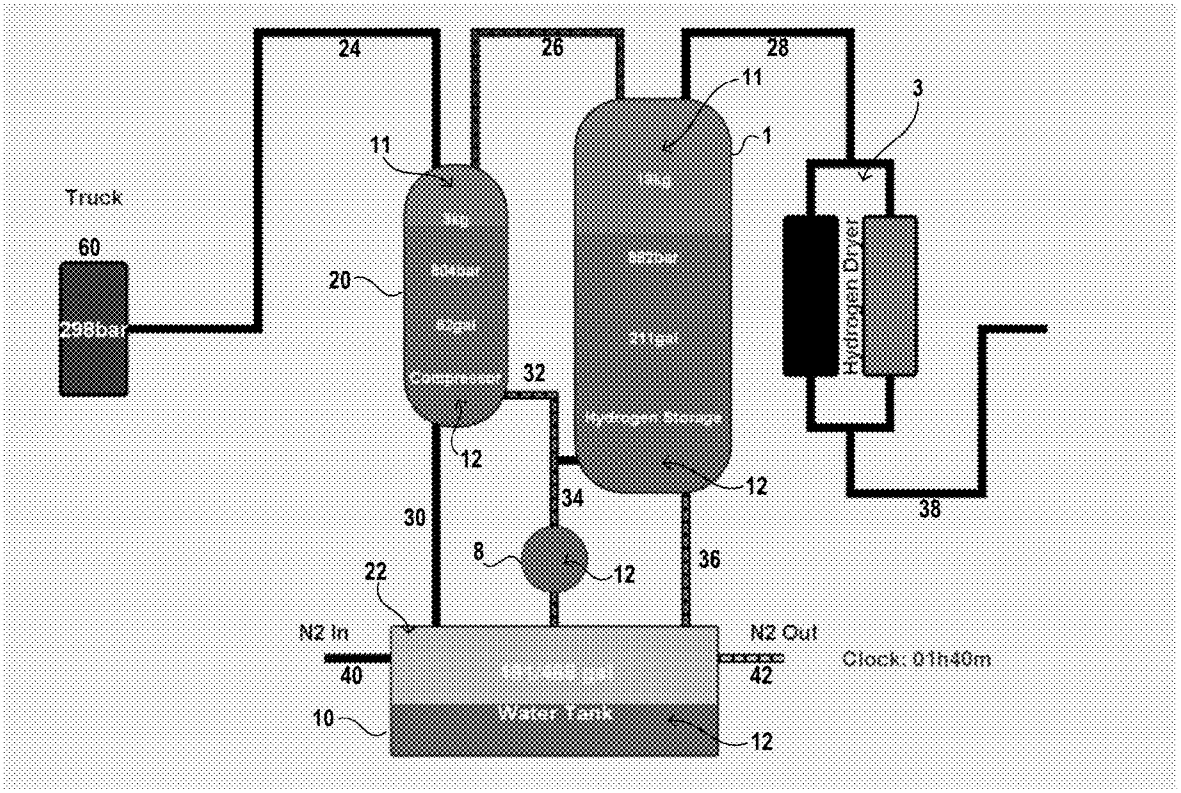
FIG. 2G illustrates refilling of the hydrogen storage vessel.

FIG. 2G illustrates refilling of the hydrogen storage vessel 1. As part of the operation to refill the storage vessel 1 with hydrogen gas from the compression vessel 20, the controller can open a drain valve at the outlet of the storage vessel to allow water 12 to drain back into the water tank 10. This is illustrated by the dashed line along water drain line 36. As further shown in FIG. 2G, the water pump 8 can continue to pump water 12 into the compression vessel 20 while water is allowed to drain from the storage vessel 1. This allows hydrogen gas 11 to be transferred from the compression vessel 20 to the storage vessel 1. In addition, the controller can open a nitrogen gas outlet valve at the water tank 10 in order to release nitrogen as the water tank refills with water 12 (as shown by the dashed line at nitrogen output line 42).

Figure 2H:
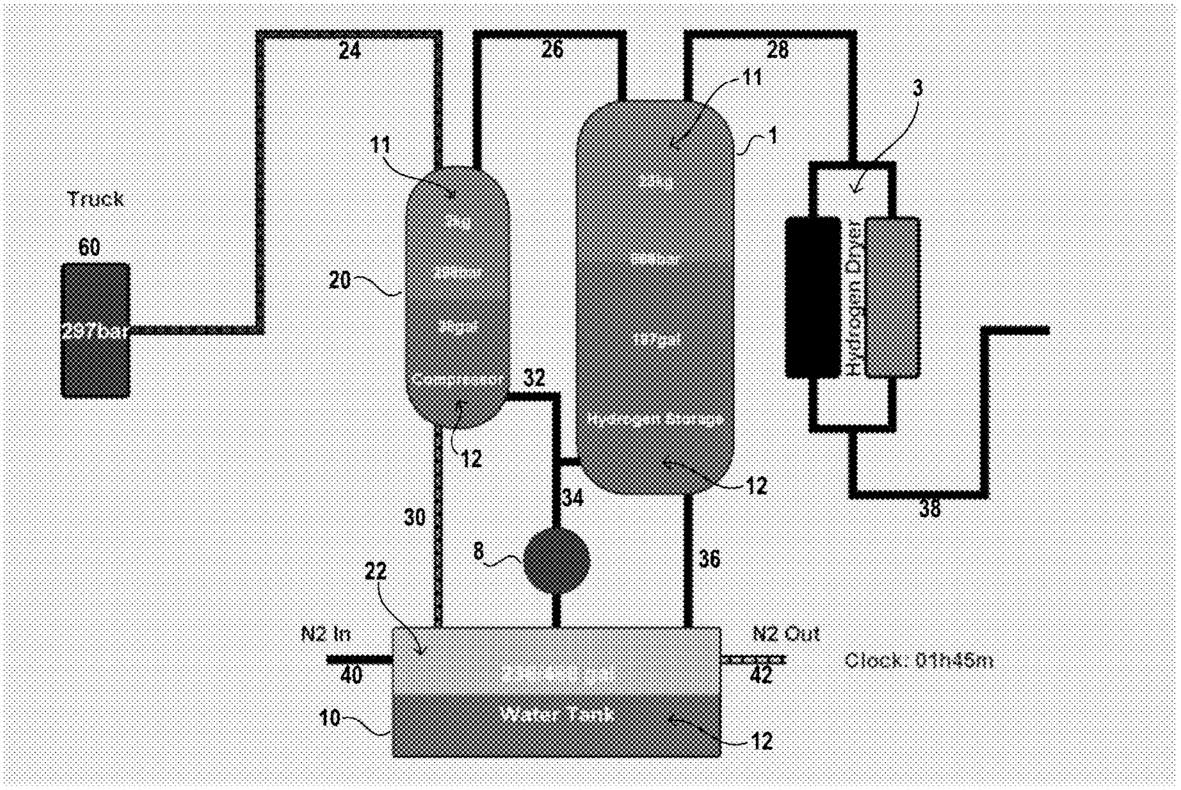
FIG. 2H illustrates the operation to refill the compression vessel from a source of relatively low-pressure hydrogen gas.

FIG. 2H illustrates the operation to refill the compression vessel 20 from a source of relatively low-pressure hydrogen gas. When the compression vessel 20 needs to be re-filled with hydrogen, water 12 in the compression vessel can be released slowly such that it draws hydrogen from the tanker truck without significantly dropping the pressure inside the compression vessel 20. This reduces the work of compression during refilling.

After the compression vessel 20 transfers its contents of hydrogen gas to the storage vessel 1, the valve between those two vessels can be closed. In addition, the controller can cause the pump 8 to cease pumping water into the compression vessel 20. FIG. 2H shows a tanker truck 60 connected to the hydrogen supply line 24. The pressure of hydrogen gas inside the tanker truck is illustrated as being a relatively low 297 bar. The controller can ensure that the respective hydrogen gas pressures in the tanker truck 60 and the compression vessel 20 are first relatively equalized (using, for example, pressure sensors in the hydrogen supply line 24 and in the compression vessel 20) before opening a hydrogen inlet valve to the compression vessel 20 while also opening a water drain valve. This allows water 12 to drain from the compression vessel 20 back into the water tank 10 via drain line 30 (as shown by the dashed line), which allows hydrogen gas 11 from the tanker truck 60 to refill the compression vessel (as shown by the dashed line along hydrogen supply line 24). In addition, the controller can open a nitrogen gas outlet valve at the water tank 10 in order to release nitrogen as the water tank refills with water 12 (as shown by the dashed line at nitrogen output line 42).

Figure 2I:
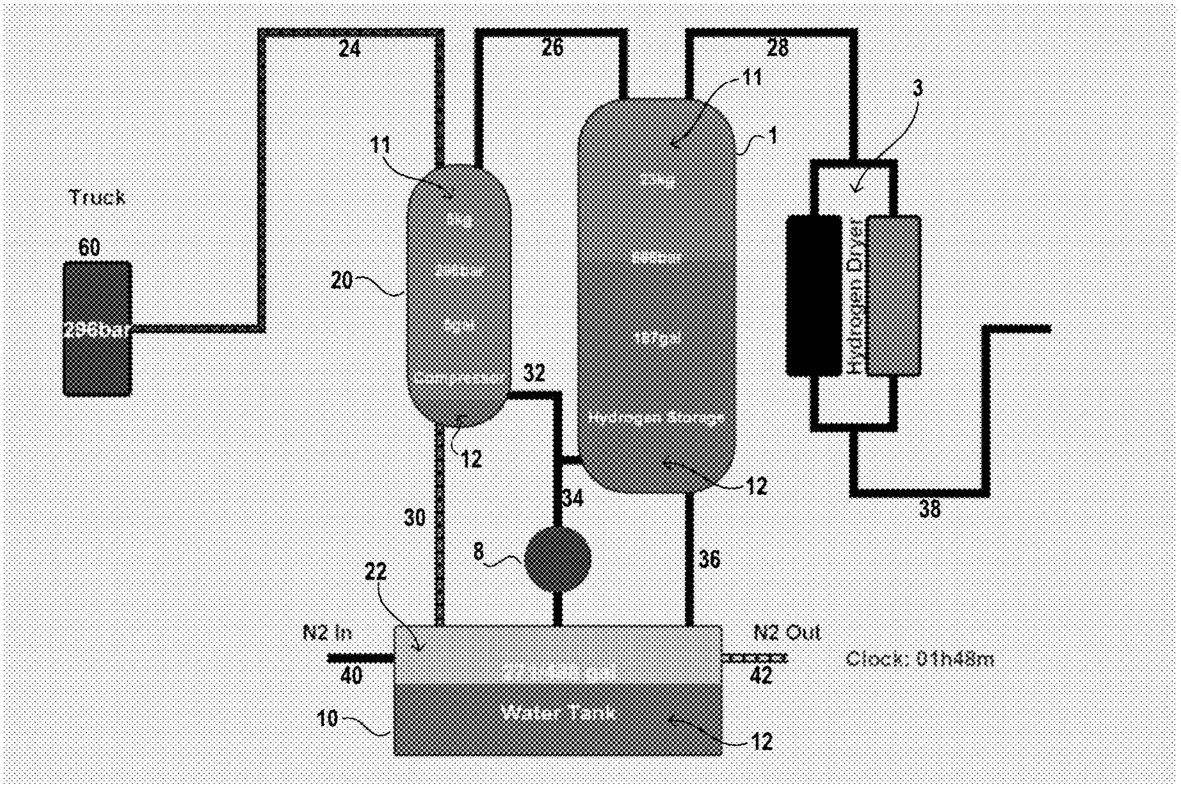
FIG. 2I illustrates the completed operation to refill the compression vessel with hydrogen gas.

FIG. 2I illustrates the completed operation to refill the compression vessel 20 with hydrogen gas. As shown, the compression vessel 20 has been refilled with 5 kg of hydrogen gas 11 at a pressure (296 bar) which matches that of the tanker trucks 60. In addition, all but 5 gallons of water 12 have been drained from the compression vessel 20. In this state, the compression vessel 20 is ready to once again compress, using water pressure, the hydrogen gas 11 which it holds so as to be able to transfer that hydrogen gas 11 to the storage vessel 1.

Figure 2J:
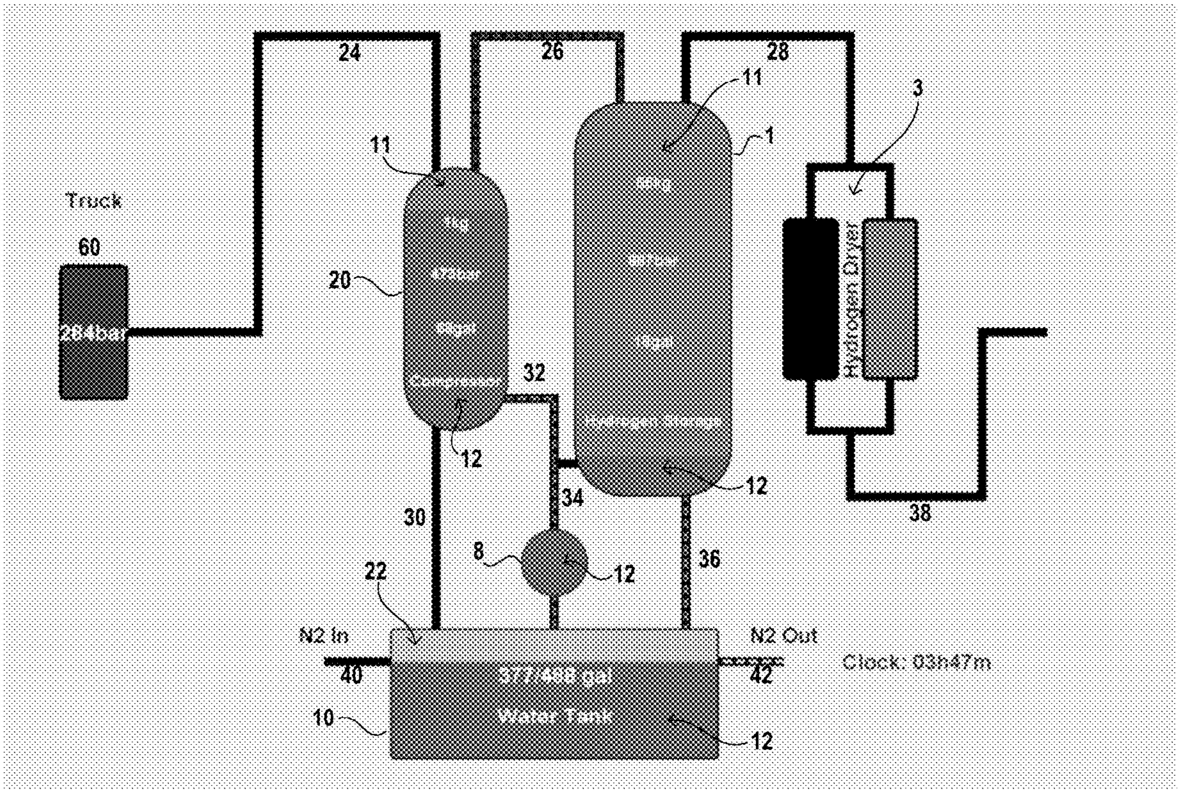
FIG. 2J illustrates a subsequent operation to refill the storage vessel with hydrogen gas.

FIG. 2J illustrates a subsequent operation to refill the storage vessel 1 with hydrogen gas 11. As shown, the system 200 is once again used the water pump 8 to force an increased volume of water 12 into the compression vessel 20, thus pressurizing the hydrogen gas 11 inside the compression vessel. The compressed hydrogen gas 11 inside the compression vessel 20 is then transferred to the storage vessel 1 in the manner previously described herein.

Figure 3:
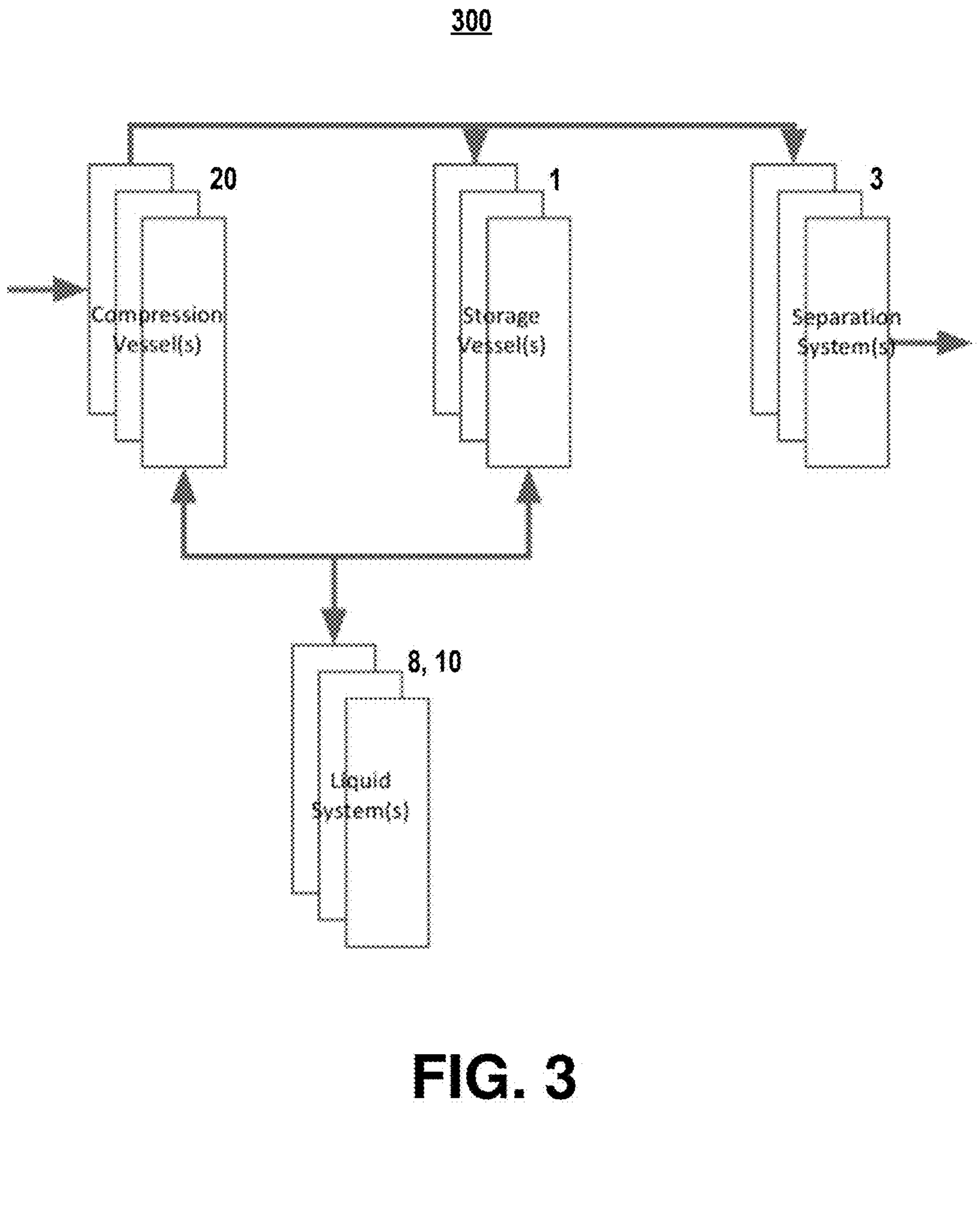
FIG. 3 illustrates another embodiment of a system for compressing, storing, and dispensing hydrogen gas.

FIG. 3 illustrates another embodiment of a system 300 for compressing, storing, and dispensing hydrogen gas. The system 300 is similar to the system 200 previously shown and described with respect to FIGS. 2A-2J except that it includes multiple instances of system 200 combined in parallel. For example, system 300 includes multiple compression vessels 20, multiple storage vessels 1, multiple separation systems (e.g., hydrogen dryers 3) and multiple liquid systems (e.g., water pump 8, water tank 10). The system 300 shown in FIG. pump 8, water tank 10). The system 300 shown in FIG. 3 can also include appropriate lines, valves, sensors, and controllers such that each liquid system can controllably pressurize hydrogen gas into each compression vessel 20 and each storage vessel 1. In addition, each compression vessel 20 can refill each storage vessel 1, and each storage vessel 1 Output hydrogen gas to each separation system 3 to ultimately be dispensed to a refueling vehicle connected to any of the separation systems.

FIG. 4 illustrates an example hydrogen refueling station 400 which can include any of the hydrogen compression, storage, and/or dispensing systems described herein. As shown in FIG. 4, the refueling station 400 can either produce hydrogen gas onsite from one or more methane steam reformer systems or via electrolysis or other means, or the refueling station can have hydrogen gas delivered via a tanker truck. The refilling station 400 can include a water purification system to produce water for cooling the reformer systems and/or for pressurizing compression and storage vessels, as described herein. In some embodiments, the refueling station 400 uses Type II water (distilled) or Type III water (reverse osmosis purified). The refueling station 400 can also include one or more compression vessels and one or more storage vessels. In some embodiments, the refueling station 400 may include a hybrid compression system such as a low-pressure MH (metal hydride) hydrogen compressor to use the waste heat from the steam methane reformer(s) to compress the produced hydrogen to an intermediate value (e.g., 400 bar) and then may use a high-pressure water compressor (e.g., compression vessel 20) for high-pressure compression from the intermediate value (e.g., 400 bar) to a high-pressure value (e.g., 900 bar). Another embodiment of a hybrid compression system may use an electrochemical compressor or mechanical compressor to compress the hydrogen gas to an intermediate value (e.g., 400 bar) and then can use the water compressor (e.g., compression vessel 20) for high-pressure compression from the intermediate value to a high-pressure value (e.g., 900 bar). In addition, the refilling station 400 can include a control center to receive signals from sensors (e.g., pressure sensors, level sensors, temperature sensors, etc.) and to control valves, pumps, motors, etc.

In the illustrated embodiments, substantially all (e.g., greater than 75%, or greater than 90%, or greater than 95%, or greater than 99%) of the stored hydrogen is accessible because the stored hydrogen remains at a usable pressure by backfilling the removed hydrogen with high-pressure water. In contrast, in conventional systems, only about 15% of the stored hydrogen can be used before the pressure drops to the point where it can no longer fill a refueling vehicle to full pressure. For conventional systems to achieve the same overall capacity, they would require much more additional storage space, which would in turn require a larger physical footprint—a premium at established refueling stations. In addition, mechanical gas compressors used in conventional systems require significant maintenance. Better lubrication and cooling can be provided by using the high-pressure water pump described herein in order to compress the hydrogen with water pressure, thus reducing maintenance costs.

Although the invention has been explained in relation to its preferred embodiment, it is to be understood that many other possible modifications and variations can be made without departing from the spirit and scope of the invention.

Other Considerations

For purposes of summarizing the disclosure, certain aspects, advantages and features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, etc. described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can comprise computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media (e.g., optical disks such as CDs or DVDs, hard disk drives, flash memories, diskettes, or the like) that, when read by a computer or other processing device, cause it to carry out the method.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A high-pressure gas storage system comprising:
a) a storage vessel configured to hold a gas and a liquid;
b) a liquid sump tank;
c) a liquid pump fluidly coupled between the liquid sump tank and the storage vessel;
d) at least one pressure sensor configured to detect a gas pressure within the storage vessel;
e) a controller communicatively coupled to the at least one pressure sensor and the liquid pump, the controller configured to activate the liquid pump to force the liquid into the storage vessel in response to a detected drop in gas pressure to maintain the gas pressure at or above a target dispensing pressure; and
f) a separation system positioned terminal to a gas outlet of the storage vessel, wherein the separation system is configured to reduce liquid saturation in the gas as the gas is dispensed from the storage vessel.

2. The system of claim 1, wherein:
a) the high-pressure gas is hydrogen.

3. The system of claim 1, wherein:
a) the storage pressure maintains the gas pressure above 750 bar absolute.

4. The system of claim 1, wherein:
a) the liquid includes water.

5. The system of claim 4, wherein:
a) the water is Type III water.

6. The system of claim 4, wherein:
a) the water is Type II water.

7. The system of claim 1, wherein:
a) the gas in the storage vessel becomes saturated above 75% with the liquid.

8. The system of claim 1, wherein:
a) the liquid saturation of the high-pressure gas is removed by the separation system.

9. The system of claim 8, wherein:
a) the separation system is a desiccant system.

10. The system of claim 9, wherein:
a) the desiccant system is regenerated using pressure swing adsorption technology.

11. The system of claim 1, wherein:
a) the liquid when not in the storage vessel is held in the liquid sump tank.

12. The system of claim 11, wherein:

a) the sump tank is covered with an inert gas blanket.

13. The system of claim 12, wherein:

a) the inert blanket gas has a nitrogen concentration of over 95% purity.

14. The system of claim 12, wherein:

a) the sump tank is maintained at an overpressure.

15. The system of claim 14, wherein:

a) the sump tank over pressure is at least 1 bar gauge.

16. The system of claim 1, wherein:

a) the storage vessel is composed of SA372 Gr J CL 70XXX material.

17. A method for compressing and storing high-pressure gas using a system comprising a compression vessel, a storage vessel, a liquid sump tank, a liquid pump, and a separation system, the method comprising:

a) drawing a gas into the compression vessel by draining a liquid from the compression vessel into the liquid sump tank;

b) compressing the gas within the compression vessel by activating the liquid pump to force liquid from the liquid sump tank into the compression vessel;

c) transferring the compressed gas from the compression vessel to the storage vessel;

d) detecting, via at least one pressure sensor, a gas pressure within the storage vessel;

e) maintaining the gas pressure at or above a target dispensing pressure by forcing liquid into the storage vessel via the liquid pump in response to a detected drop in gas pressure; and f) reducing liquid saturation in the gas using the separation system as the gas is dispensed through a gas outlet of the storage vessel.

18. The method of claim 17, wherein:

a) the high-pressure gas is hydrogen.

19. The method of claim 17, wherein:

a) the liquid includes water.

20. The method of claim 19, wherein:

a) the water is Type III water.

21. The method of claim 19, wherein:

a) the water is Type II water.

22. The method of claim 17, wherein:

a) the gas in the compression vessel becomes saturated above 75% with the liquid.

23. The method of claim 17, wherein:

a) the liquid saturation of the high-pressure gas is removed by the separation system.

24. The method of claim 23, wherein:

a) the separation system is a desiccant system.

25. The method of claim 24, wherein:

a) the desiccant system is regenerated using a pressure swing adsorption technology.

26. The method of claim 17, wherein:

a) the liquid when not in the storage vessel is held in sump tank.

27. The method of claim 26, wherein:

a) the sump tank is covered with an inert gas blanket.

28. The method of claim 27, wherein:

a) the inert blanket gas has a nitrogen concentration of over 95% purity.

29. The method of claim 26, wherein:

a) the sump tank is maintained at an overpressure.

30. The method of claim 29, wherein:

a) the sump tank over pressure is at least 1 bar gauge.

31. The method of claim 17, further comprising:

a) a hybrid compression system with a low-pressure hydrogen gas compressor configured to compress the gas to an intermediate pressure, and the compression vessel is configured to compress the gas from the intermediate pressure to a high pressure.

32. A method for compressing and storing high-pressure hydrogen gas using a controller and a high-pressure liquid pump, the method comprising:

a) directing, by the controller, a compressor to compress hydrogen gas to an intermediate input pressure;

b) opening, by the controller, a fill valve to allow the hydrogen gas at the intermediate input pressure to enter a compression vessel;

c) opening, by the controller, a vessel drain valve as the hydrogen gas fills the compression vessel;

d) closing, by the controller, the fill valve when a pressure sensor detects that the pressure within the compression vessel has equalized with the intermediate input pressure;

e) activating, by the controller, a high-pressure liquid pump to force liquid from a liquid sump tank into the compression vessel to compress the hydrogen gas to a target pressure of approximately 800 bar;

f) deactivating, by the controller, the high-pressure liquid pump and closing the vessel drain valve once the target pressure is reached;

g) opening, by the controller, a vessel supply valve to allow the compressed hydrogen gas to flow toward a gas outlet; and h) activating, by the controller, a separation system to reduce liquid saturation in the hydrogen gas as it is dispensed.

* * * * *